United States Patent
Tamura

(10) Patent No.: US 7,581,841 B2
(45) Date of Patent: Sep. 1, 2009

(54) LUMINANCE CORRECTING APPARATUS, LUMINANCE CORRECTING METHOD, AND PROJECTOR

(75) Inventor: Youichi Tamura, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 77 days.

(21) Appl. No.: 11/081,206

(22) Filed: Mar. 16, 2005

(65) Prior Publication Data
US 2005/0207046 A1 Sep. 22, 2005

(30) Foreign Application Priority Data
Mar. 19, 2004 (JP) ............... 2004-080364
Mar. 29, 2004 (JP) ............... 2004-096326

(51) Int. Cl.
*G03B 21/00* (2006.01)
(52) U.S. Cl. .................... 353/121; 353/31
(58) Field of Classification Search ........ 353/121, 353/85, 97, 119, 69, 30, 31, 21, 28, 29; 348/745, 348/798, 602, 603
See application file for complete search history.

(56) References Cited

U.S. PATENT DOCUMENTS

| | | | | |
|---|---|---|---|---|
| 4,334,782 A | * | 6/1982 | Thornton et al. | 356/406 |
| 6,990,234 B2 | * | 1/2006 | Kanai | 382/167 |
| 7,052,138 B2 | * | 5/2006 | Matsui | 353/31 |
| 7,066,606 B2 | * | 6/2006 | Greve et al. | 353/85 |
| 2003/0164927 A1 | * | 9/2003 | Tsukada | 353/31 |
| 2005/0083293 A1 | * | 4/2005 | Dixon | 345/102 |

FOREIGN PATENT DOCUMENTS

| | | |
|---|---|---|
| JP | 07-318893 | 12/1995 |
| JP | 2001-320725 | 11/2001 |
| JP | 2002-094822 | 3/2002 |
| JP | 2002-095021 | 3/2002 |
| JP | 2002-191055 | 7/2002 |
| JP | 2002-281520 | 9/2002 |
| JP | 2002-311503 | 10/2002 |
| JP | 2003-050572 | 2/2003 |
| JP | 2003-279887 | 10/2003 |
| JP | 2003-304551 | 10/2003 |
| JP | 2003-323610 | 11/2003 |
| JP | 2003-333611 | 11/2003 |
| JP | 2003-339056 | 11/2003 |

* cited by examiner

*Primary Examiner*—Hung Henry Nguyen
(74) *Attorney, Agent, or Firm*—Scully, Scott, Murphy & Presser, P.C.

(57) ABSTRACT

A luminance correcting apparatus has a sensor for detecting luminances of reflected lights of projected lights individually in each of at least two colors which are reflected from a screen, a first memory for storing information representing luminances of the reflected lights in the respective colors which are detected by the sensor, a second memory for storing information representing predetermined reference luminances of the reflected lights in the respective colors, and a luminance correcting data generator for generating luminance correcting data by comparing the information stored in the first memory and the information stored in the second memory.

10 Claims, 5 Drawing Sheets

LUMINANCE CORRECTING APPARATUS, LUMINANCE CORRECTING METHOD, AND PROJECTOR

BACKGROUND OF THE INVENTION

1. Field of the Invention

The present invention relates to the art of correcting the luminance of an image projected onto a screen, and more particularly to the art of correcting the luminance of an image projected by a projector.

2. Description of the Related Art

Screens onto which image light is projected by projectors may not necessarily have predetermined reflection characteristics. The color reproducibility on a screen may vary depending on the reflection characteristics on the screens and may be changed also by ambient light or environmental light. Heretofore, it has been customary to increase the color reproducibility of a screen by detecting the luminance or intensity of reflected light from the image light projected onto the screen for some wavelengths, and correcting the luminance based on the detected data. More specifically, the reflected light is spectrally separated into the three primary colors, i.e., red, green, and blue lights by a diffraction grating or a prism, luminance of each primary color is detected by a color sensor, and the image light is adjusted to normalize the luminances of the three primary colors to thereby improve the color reproducibility. The color sensor which is incorporated in some projectors generally comprises three monochromatic color filters, i.e., a red filter for detecting the light with a wavelength of around 660 nm, a green filter for detecting the light with a wavelength of around 540 nm, and a blue filter for detecting the light with a wavelength of around 460 nm. FIG. 1 shows the characteristics of such monochromatic color filters. In FIG. 1, the horizontal axis represents the wavelength and the vertical axis represents the detection sensitivity. Details of the above luminance correcting process are disclosed in Japanese laid-open patent publication No. 2003-323610.

Conventionally, the image light projected from a projector includes only the three primary colors. Therefore, it has been possible to sufficiently correct color reproducibility according to the luminance correction based on detection results from three independent and inexpensive color sensors which individually detect the three primary colors. However, some projectors available in recent years are designed to project another light, in addition to the three-primary lights, as independent image light for better color reproducibility. For the purpose of distinguishing different color lights, image light in red will be referred to as "image light R", image light in green as "image light G", and image light in blue as "image light B," respectively.

When a projector projects another light, in addition to the three-primary lights, as an independent image light, the luminance correction based on detection results from a color sensor which comprises three monochromatic filters is not sufficient, and the projection of the light other than the three-primary lights is not effective enough to give the projector better color reproducibility. For example, even when image light Ye, in addition to image light R, image light G, and image light B, is projected onto the screen, any one of the red filter, the green filter, and the blue filter is almost insensitive to reflected light of image light Ye. Consequently, the luminance correction based on the luminances of reflected lights detected by the red filter, the green filter, and the blue filter does not produce right corrected results, and fails to provide sufficient color reproducibility.

SUMMARY OF THE INVENTION

It is an object of the present invention to provide a projector which is capable of performing a luminance correction process that is effective for changing in the luminance of a light in a color in addition to the three primary colors.

According to the present invention, there is provided a luminance correcting apparatus including detecting means for detecting luminances of reflected lights, which is reflected from a screen, of projected lights individually in each of at least two colors, first memory means for storing information representing luminances of the reflected lights in the respective colors which are detected by the detecting means, second memory means for storing information representing predetermined reference luminances of the reflected lights in the respective colors, and luminance correcting data generating means for generating luminance correcting data by comparing the information stored in the first memory means and the information stored in the second memory means.

The luminance correcting apparatus may be combined with a projecting apparatus for projecting image lights in at least two colors in order to provide a projector which is capable of performing a luminance correction process that is effective on a change in the luminance of a light in a color other than the three primary colors.

If the first memory means stores information produced by subtracting the luminance of ambient light reflected from the screen when no image light projected onto the screen, from the luminances of the reflected lights in the respective colors which are detected by the detecting means, then the effect of ambient light is eliminated in order to achieve more accurate luminance correction.

If the second memory means stores information representing the luminances of the reflected lights in the respective colors which are detected by the detecting means when image lights in at least two colors are individually projected onto a white screen, the effect of the color of the screen is eliminated in order to achieve more accurate luminance correction.

A method of correcting the luminance of an image projected onto a screen according to the present invention has at least the following four steps (1) through (4) of:

(1) successively projecting image lights in at least two colors produced by an image forming device onto a screen;

(2) detecting luminance of a reflected light from an image light projected onto the screen each time an image light in a different color is projected onto the screen;

(3) generating luminance correcting data by comparing detected luminances of reflected lights in respective colors with predetermined reference luminances for the respective colors; and (4) correcting an image signal input to the projecting apparatus based on the generated luminance correcting data.

Another method of correcting the luminance of an image projected onto a screen according to the present invention has at least the following four steps (1) through (4) of:

(1) projecting a mixed-color image light including image lights in at least two colors produced by an image forming device onto a screen;

(2) individually detecting luminances of reflected lights in at least two colors included in reflected lights from the screen;

(3) generating luminance correcting data by comparing the detected luminances in the respective colors with predetermined reference luminances for the respective colors; and (4) correcting an image signal input to the projecting apparatus based on the generated luminance correcting data.

According to the present invention, even if image light in any color is projected onto the screen, a reduction in the luminance of reflected light from the projected image light can be detected for appropriate luminance correction.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
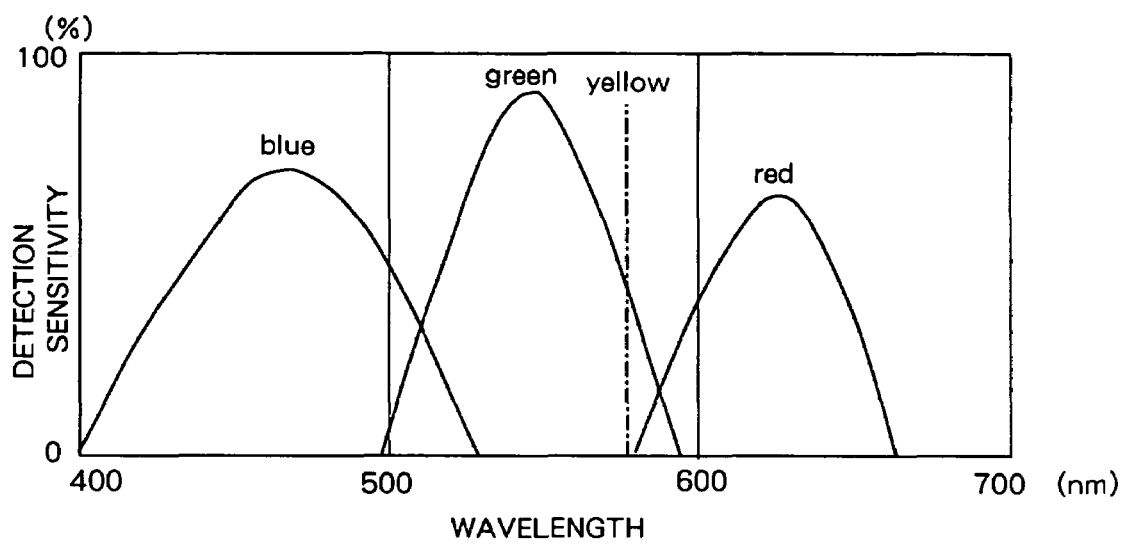
FIG. 1 is a diagram showing the characteristics of conventional monochromatic color sensors.
Figure 2:
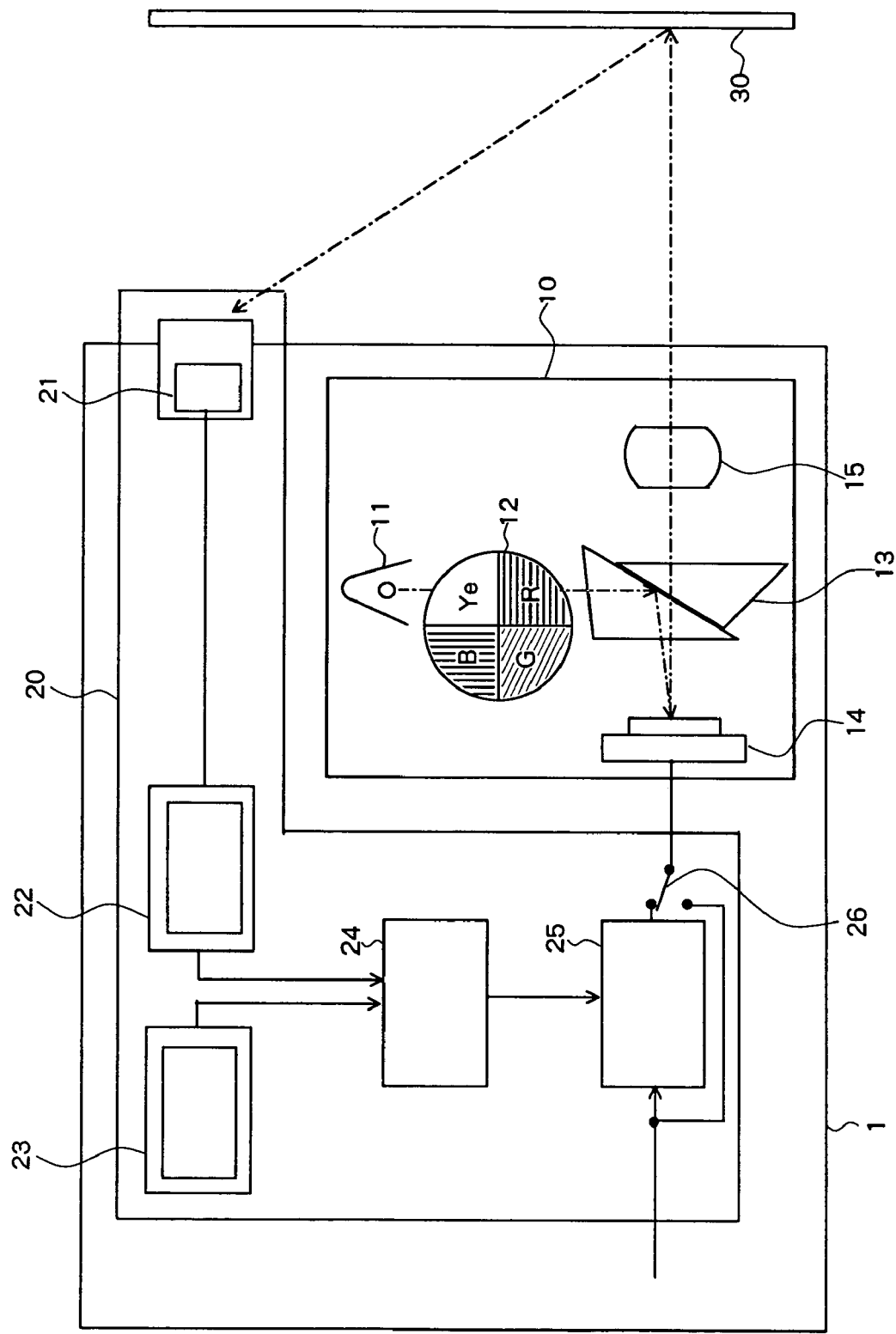
FIG. 2 is a block diagram of a projector according to an embodiment of the present invention.

FIG. 2 shows a block diagram of projector 1 according to an embodiment of the present invention. Projector 1 has projecting apparatus 10 and luminance correcting apparatus 20.

Projecting apparatus 10 comprises light source device 11, color wheel 12 for separating white light emitted from light source device 11 into different color lights according to a time-division process, TIR prism (total-internal-reflection prism) 13 for reflecting the color lights separated by color wheel 12 toward image forming device 14 (described later) and passing image light generated by image forming device 14 therethrough, image forming device 14 for spatially modulating the image lights reflected by TIR prism 13 with an image signal to generate image light, and projecting lens 15 for projecting the image light that has passed through the TIR prism 13 onto screen 30 at an enlarged scale.

Luminance correcting apparatus 20 comprises sensor 21 for detecting the luminance of light reflected from screen 30, first memory 22 for storing information about the luminance of the reflected light detected by sensor 21, second memory 23 for storing information about reference luminance to be compared with the luminance information stored in first memory 22, luminance correcting data generator 24 for generating luminance correcting data based on the information stored in first memory 22 and second memory 23, and correcting circuit 25 for correcting the image signal input to image forming device circuit 14 based on the luminance correcting data generated by luminance correcting data generator 24.

Light source device 11 has a light source comprising a high-pressure discharge lamp such as a metal halide lamp, a xenon lamp, a mercury lamp, or the like, and a reflector disposed around the light source. The reflector has a reflecting surface such as a spheroidal-shaped surface, for example, and serves to focus light radiated in all directions from the light source that is located at a first focal point thereof onto a point near a second focal point thereof. The reflector is not limited to certain particular shapes, but may be of any shapes insofar as they can apply the light from the light source efficiently to color wheel 12.

Color wheel 12 has a basically fan-shaped red filter for passing only red light, a basically fan shaped green filter for passing only green light, a basically fan shaped blue filter for passing only blue light, and a basically fan shaped yellow filter for passing only yellow light, which are angularly spaced at intervals of 90°. Color wheel 12 is disposed near the light converging point of the reflector of light source device 11, e.g., the second focal point of the reflector if the reflector has a spheroidal surface. Color wheel 12 is rotated in a circumferential direction about its center by an actuating mechanism (not shown). White light emitted from light source device 11 is applied to the color filters of the color wheel 12, and separated into red light, green light, blue light, and yellow light thereby according to a time-division process. The separated color lights are applied at a certain angle of incidence to TIR prism 13.

TIR prism 13 has a total reflection surface which is angularly positioned such that light passing through color wheel 12 is applied to the total reflection surface at an angle greater than the critical angle, and light reflected from image generating device 14 is applied to the total reflection surface at an angle smaller than the critical angle. Therefore, the color lights separated by color wheel 12 are reflected by the total reflection surface of TIR prism 13 and applied to image forming device 14, and the image light reflected by image forming device 14 passes through the total reflection surface of TIR prism 13.

Image forming device 14 comprises a reflective liquid-crystal panel or a DLP (registered trademark). Image forming device 14 has cells or minute mirrors corresponding to image pixels. These cells or minute mirrors are individually actuated by an image signal applied to image forming device 14 to spatially modulate the color lights that are applied to the cells or minute mirrors, thereby successively generating image light R, image light G, image light B, and image light Ye. These image lights R, G, B, and Ye generated by image forming device 14 pass through the total reflection surface of TIR prism 13, and are successively projected by projecting lens 15 onto screen 30. The image lights projected onto screen 30 are visually recognized as a full-color image by the human eye due to the afterimage effect.

Sensor 21 is a photoelectric transducer for outputting a voltage depending on the luminance of incident light, and comprises a photodiode in the present embodiment. The value of a voltage which is output from sensor 21 is stored as luminance information in first memory 22, which generates a luminance table made up of detected voltage values. Second memory 23 stores in advance a reference luminance table which is generated based on reference luminance information which comprises the values of voltages that are outputs from sensor 21 when image lights in different colors are individually projected onto a white screen. First memory 22 and second memory 23 are not required to be two physically independent memories, but may be two areas, respectively, of one memory. The reflected light from image light R will be referred to as "reflected light R", the reflected light from image light G as "reflected light G", the reflected light from image light B as "reflected light B", and the reflected light from image light Ye as "reflected light Ye".

Luminance correcting data generator 24 reforms the luminance table stored in first memory 22 based on the reference luminance table stored in second memory 23, and generates a reformed table. Luminance correcting data generator 24 outputs the generated reformed table as luminance correcting data to correcting circuit 25. Specifically, luminance correcting data generator 24 calculates ratios of the actual luminances of reflected lights R, G, B, and Ye which are represented by the luminance table and the ideal luminances of the reflected lights which are represented by the reference luminance table, and employs the calculated ratios as the reformed table.

For example, if image lights R, G, B, and Ye are projected onto a screen having uniformly low reflection efficiencies for the entire range of visible light wavelengths, e.g., a gray screen, then the image lights are absorbed by the screen in substantially equal proportions. The luminances of reflected lights R, G, B, and Ye which are represented by the luminance table at this time are schematically illustrated as a left luminance table in FIG. 3, the ideal luminances of reflected lights R, G, B, and Ye which are represented by the reference luminance table at this time are schematically illustrated as a central reference luminance table in FIG. 3, and the luminances which are represented by the reformed table are schematically illustrated as a right reformed table in FIG. 3. It can be seen that the luminances of reflected lights R, G, B, and Ye which are represented by the luminance table are almost uniformly smaller than the ideal luminances of reflected lights R, G, B, and Ye which are represented by the reference luminance table. The ratios of the luminances of reflected lights R, G, B, and Ye which are represented by the luminance table and the ideal luminances of reflected lights R, G, B, and Ye which are represented by the reference luminance table are constant, and generated as the reformed table in FIG. 3.

If image lights R, G, B, and Ye are projected onto a screen having a low reflection efficiency only for light in a certain wavelength range, e.g., yellow light in a wavelength range of about 580 nm, then image light Ye out of all image lights R, G, B, and Ye is absorbed in a relatively large proportion by the screen. The luminances of reflected lights R, G, B, and Ye which are represented by the luminance table at this time are schematically illustrated as the left luminance table in FIG. 4, the ideal luminances of reflected lights R, G, B, and Ye which are represented by the reference luminance table at this time are schematically illustrated as the central reference luminance table in FIG. 4, and the luminances which are represented by the reformed table are schematically illustrated as the right reformed table in FIG. 4. It can be seen that the luminances of reflected lights R, G, and B which are represented by the luminance table are equal to the ideal luminances of reflected lights R, G, and B which are represented by the reference luminance table, but the luminance of reflected light Ye which is represented by the luminance table is smaller than the ideal luminance of reflected light Ye which is represented by the reference luminance table. The ratios of the luminances of reflected lights R, G, B, and Ye which are represented by the luminance table and the ideal luminances of reflected lights R, G, B, and Ye which are represented by the reference luminance table are calculated and generated as the right reformed table in FIG. 4. If image light Ye is absorbed in a relatively large proportion and the luminance of reflected light Ye is decreased, then the human eye perceives that blue, which is a complementary color of yellow, has increased, but perceives that yellow has not been decreased. Actually, however, the luminances of image lights R, G, and B are not changed. Therefore, even if the projector has monochromatic sensors for individually detecting the luminances of reflected lights R, G, and B, no luminance change is detected and no luminance correction is performed. However, sensor 21 does not have wavelength selecting means such as color filters and can detect the luminances of lights in the entire visible wavelength range. Accordingly, when the luminances of reflected lights R, G, and B and the luminances of other reflected lights are lowered, such a luminance reduction is detected, and an appropriate reformed table is generated.

Figure 3:
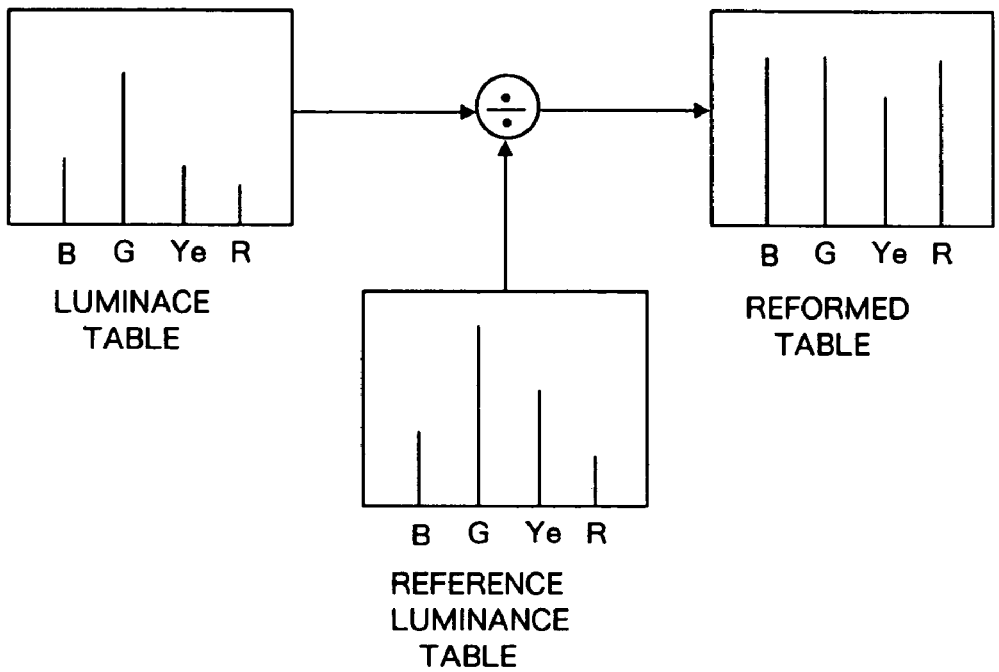
FIG. 3 is a diagram showing an example of a luminance table, a reference luminance table, and a reformed table.

Correcting circuit 25 processes the image signal according to the luminance correcting data output from luminance correcting data generator 24, and outputs the processed image signal to image forming device 14. Specifically, if the reformed table shown in FIG. 3 is generated, then the luminance balance of reflected lights R, G, B, and Ye is the same as the ideal luminance balance represented by the reference luminance table, and there is no need for luminance correction. Therefore, correcting circuit 25 outputs the supplied image signal uncorrected to image forming device 14.

Figure 4:
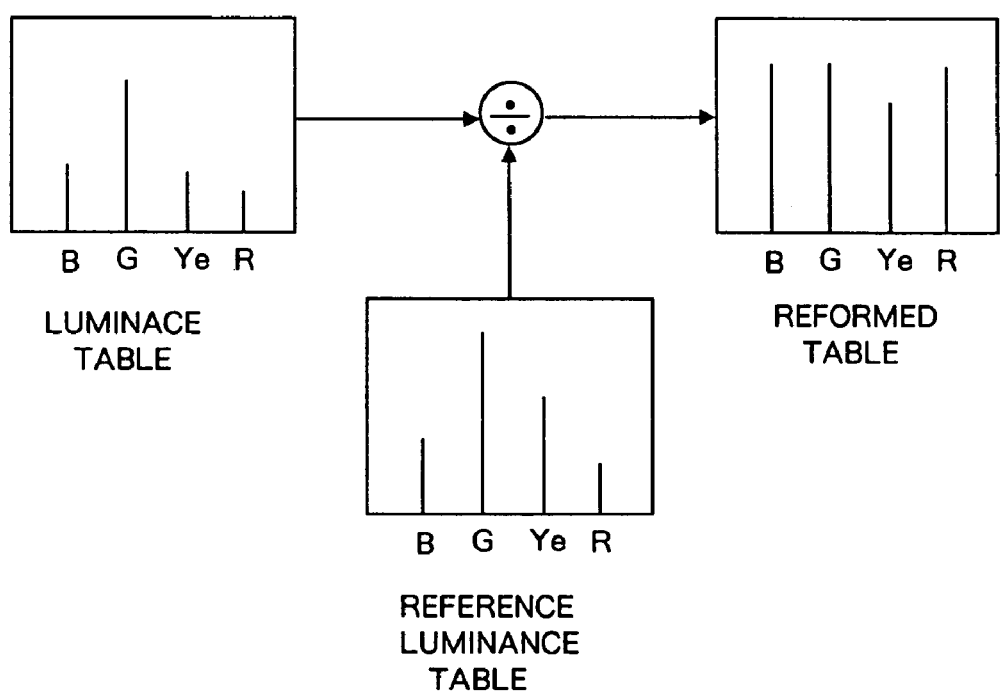
FIG. 4 is a diagram showing another example of a luminance table, a reference luminance table, and a reformed table.

If the reformed table shown in FIG. 4 is generated, then at least one of presently reflected lights R, G, B, and Ye has its luminance lower than the ideal luminance, and the luminance needs to be corrected for good color reproducibility. Correcting circuit 25 now corrects the luminance data in the image signal such that the luminances of those image lights in the colors other than the color whose luminance is lowered in the reformed table are reduced, or the luminance of the image light in a complementary color of the color whose luminance is lowered in the reformed table is decreased. For example, if the reformed table shown in FIG. 4 is generated, since the luminance of reflected color Ye is lowered, the luminances of all the image lights are decreased to the level of the luminance of reflected light Ye, or the luminance of image light B is decreased to the level of the luminance of reflected light Ye.

Figure 5:
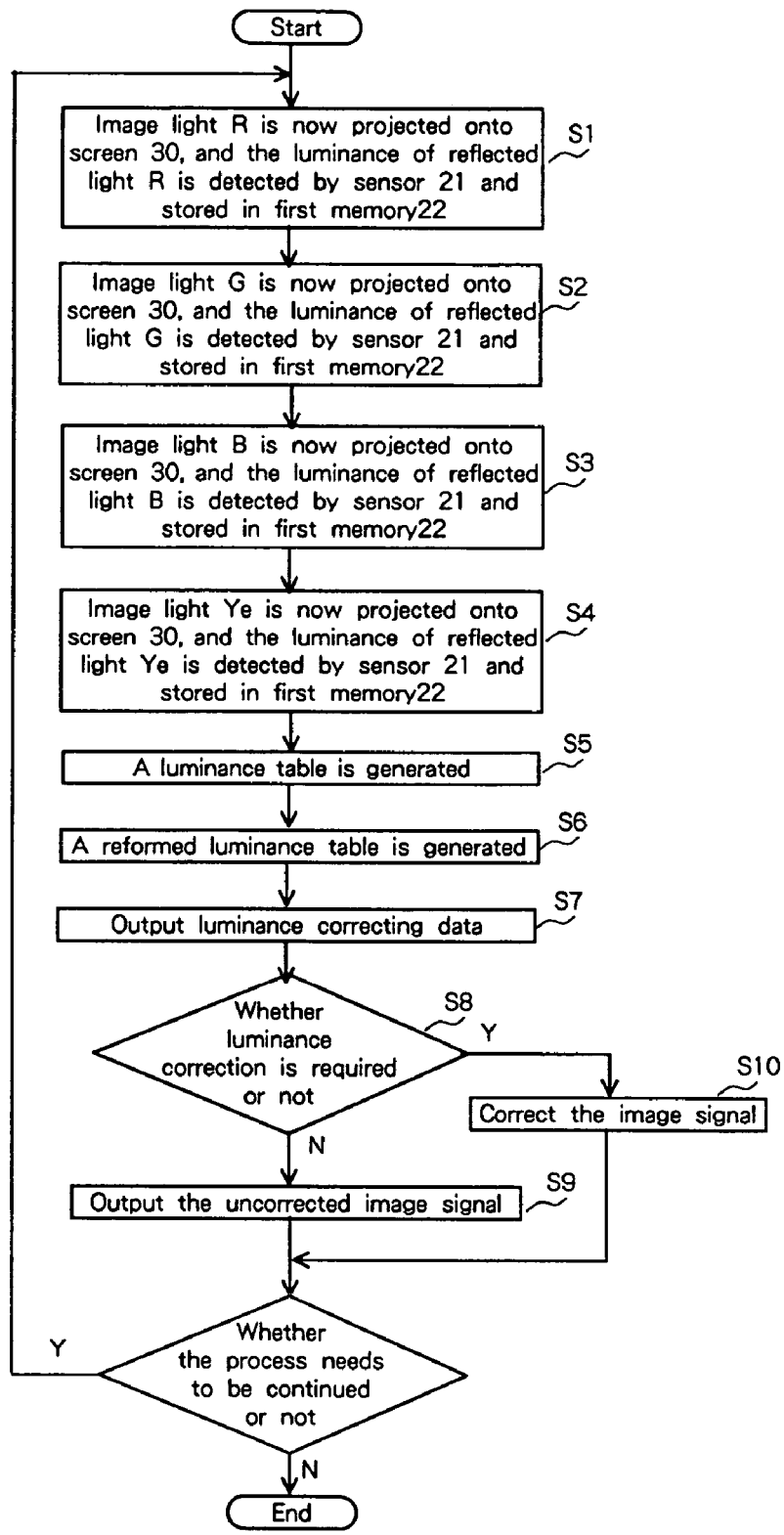
FIG. 5 is a flowchart of a luminance correcting method according to the present invention.

A luminance correcting method performed by projector 1 will be described below with reference to FIG. 5.

The actuating mechanism (not shown) of color wheel 12 shown in FIG. 2 is controlled by a control signal from a controller (not shown) to rotate color wheel 12 to bring the red filter thereof into the path of light emitted from light source device 11. Image light R is now projected onto screen 30, and the luminance of reflected light R is detected by sensor 21 and stored in first memory 22 in step S1.

Then, the actuating mechanism rotates color wheel 12 to bring the green filter thereof into the path of the light. Image light G is now projected onto screen 30, and the luminance of reflected light G is detected by sensor 21 and stored in first memory 22 in step S2.

Then, the actuating mechanism rotates color wheel 12 to bring the blue filter thereof into the path of the light. Image light B is now projected onto screen 30, and the luminance of reflected light B is detected by sensor 21 and stored in first memory 22 in step S3.

Then, the actuating mechanism rotates color wheel 12 to bring the yellow filter thereof into the path of the light. Image light Ye is now projected onto screen 30, and the luminance of reflected light Ye is detected by sensor 21 and stored in first memory 22 in step S4.

The sequence of steps S1 through S4 may be changed as desired insofar as the image lights in two or more colors are successively projected onto screen 30 for displaying a full-color image thereon and the luminances of the reflected lights are detected by sensor 21. While steps S1 through S4 are being executed, an image signal is supplied to image forming device 14 while bypassing correcting circuit 25 through switch 26, and image forming device 14 is operated at a maximum output level.

The luminance of the reflected color which is currently detected by sensor 21 can easily be recognized by identifying the color filter that is currently in the path of light based on the angular displacement of color wheel 12. The angular displacement of color wheel 12 can be recognized based on the number of pulses of the control signal supplied to the actuating mechanism or an output signal from an encoder which is combined with color wheel 12.

A luminance table is generated based on the luminances of reflected lights R, G, B, and Ye that are detected in steps S1 through S4, and stored in first memory 22 in step S5.

Then, luminance correcting data generator 24 generates a reformed table based on the luminance table stored in first memory 22 and the reference luminance table stored in second memory 23 in step S6. The generated reformed table is output as luminance correcting data to correcting circuit 25 in step S7. The process of generating a reformed table has been described above, and will not be described in detail below.

Then, correcting circuit 25 determines whether luminance correction is required or not in step S8. Specifically, if the luminances of reflected lights R, G, B, and Ye which are represented by the reformed table supplied as the luminance correcting data are equal to each other, then correcting circuit 25 judges that no luminance correction is required. In this case, correcting circuit 25 outputs the supplied image signal uncorrected to image forming device 14 in step S9. However, if at least one of the luminances of reflected lights R, G, B, and Ye which are represented by the reformed table supplied as the luminance correcting data is relatively low, then correcting circuit 25 judges that luminance correction is required.

If correcting circuit 25 judges that luminance correction is required in step S8, then correcting circuit 25 corrects the luminance data in the image signal such that the luminances of the colors other than the luminance of the color which is relatively low are lowered or the luminance of the color which is complementary to the color whose luminance is relatively low is lowered in step S10. Thereafter, correcting circuit 25 outputs the corrected image signal to image forming device 14. If the process needs to be continued, then control goes back to step S1 to repeat steps S1 through S10.

In the present embodiment, image light Ye in addition to image lights R, G, and B are projected onto screen 30. However, the color of image light to be projected, in addition to image lights R, G, and B, is not limited to yellow, but may be any desired color. For example, image light in light blue or purple may be projected onto screen 30. If it is desired to change the colors of image lights to be projected, then color wheel 12 shown in FIG. 2 may be replaced with a color wheel capable of separating light into the desired color lights. Sensor 21 shown in FIG. 2 has no wavelength selecting capability. Therefore, irrespective of the color in which the projector projects image light, a reduction in the luminance of reflected light from the projected image light can be detected for appropriate luminance correction.

Figure 6:
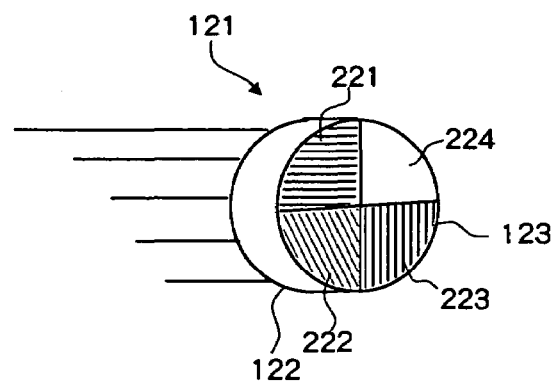
FIG. 6 is a view of another sensor which may be used in the luminance correcting method according to the present invention.
Figure 7:
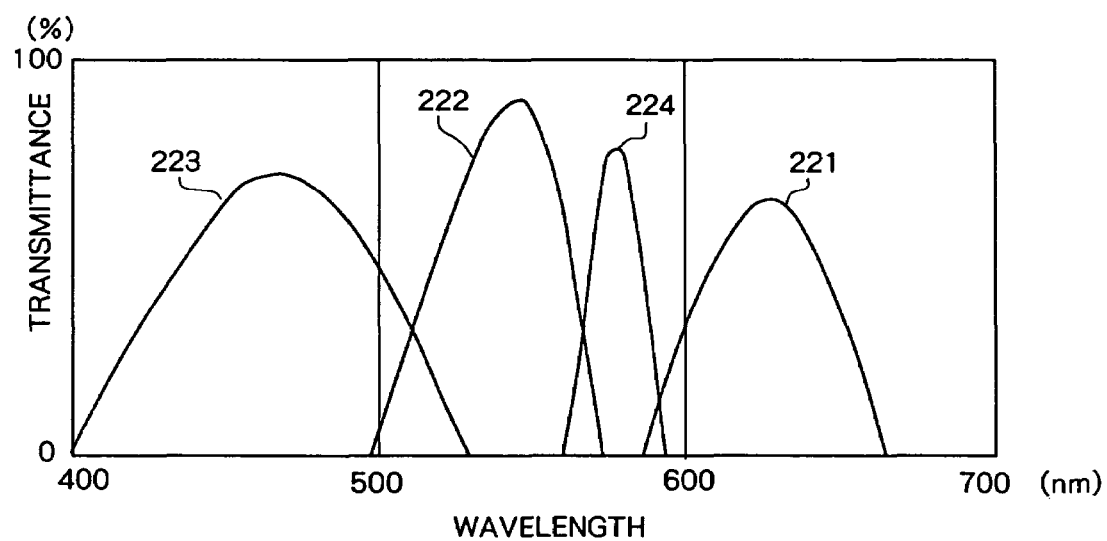
FIG. 7 is a diagram showing the characteristics of color filters of the sensor illustrated in FIG. 6.

FIG. 6 shows another sensor which may be used in the luminance correcting method according to the present invention. As shown in FIG. 6, sensor 121 has common substrate 122 having four photoelectric transducers and disk-shaped wavelength selecting filter assembly 123 disposed in front of common substrate 122. Wavelength selecting filter assembly 123 comprises a circumferential array of angularly spaced sectorial color filters 221, 222, 223, 224 each having a central angle of 90° for selectively passing one of the following lights, red light, green light, blue light, and yellow light. FIG. 7 shows the characteristics of color filters 221, 222, 223, 224, and has a horizontal axis that represents light wavelengths and a vertical axis that detects transmittances of the filters. Reflected light R passes through color filter 221 which has characteristics for passing red light and reflecting other color lights, and is applied to the associated photoelectric transducer. Reflected lights G, B, and Ye similarly pass through color filters 222, 223, 224 which have characteristics for passing green, blue, and yellow lights and reflecting other color lights, and then each light in different colors is inputted to each corresponding the photoelectric transducers. A predetermined voltage is applied to each of the photoelectric transducers. When reflected light is applied to each of the photoelectric transducers, the photoelectric transducer outputs a voltage that depends on the luminance of the applied reflected light.

Sensor 21 shown in FIG. 2 may be replaced with sensor 121 shown in FIG. 6. If sensor 121 shown in FIG. 6 is used instead of sensor 21 shown in FIG. 2, then voltages output from the photoelectric transducers of sensor 121 are supplied to first memory 22 shown in FIG. 2, as information representing the luminances of reflected lights that are applied to the photoelectric transducers. Therefore, luminance correction can be performed in substantially the same steps as steps S1 through S10 shown in FIG. 5. However, steps S1 through S4 are performed simultaneously.

Sensor 121 shown in FIG. 6 has a wavelength selecting ability. Therefore, even if reflected lights including at least two of reflected lights R, G, B, and Ye are applied to sensor 121, the luminances of the reflected lights are individually detected. As a result, when mixed-color image light comprising a combination of image lights R, G, B, and Ye is projected onto the screen, the luminance of full-color image light can be corrected depending on a change in the luminances of reflected lights R, G, B, and Ye.

The photoelectric transducers on common substrate 122 may be any device insofar as they can output a voltage depending on the luminance of light applied thereto, e.g., phototransistors, CCD sensors, CMOS sensors, PSD sensors, etc.

While preferred embodiments of the present invention have been described using specific terms, such description is for illustrative purposes only, and it is to be understood that changes and variations may be made without departing from the spirit or scope of the following claims.

What is claimed is:

1. A luminance correcting apparatus for correcting the luminance of an image projected onto a screen by a projecting apparatus based on the luminance of reflected light from image light projected onto the screen by the projecting apparatus, comprising:

detecting means for detecting luminance of reflected lights of projected lights individually in red, green, blue and one other color having a center wavelength that is different from a center wavelength of red, green and blue;

first memory means for storing information representing luminances of the reflected lights in the respective colors which are detected by said detecting means;

second memory means for storing information representing predetermined reference luminances of the reflected lights in the respective colors;

luminance correcting data generating means for generating luminance correcting data by comparing the information stored in said first memory means and the information stored in said second memory means; and correcting means for correcting an image signal input to said projecting apparatus based on said luminance correcting data to increase color reproducibility.

2. A luminance correcting apparatus according to claim 1, wherein the information stored in said first memory means comprises information produced by subtracting the luminance of ambient light reflected from said screen with no image light projected onto said screen, from the luminances of the reflected lights in the respective colors which are detected by said detecting means.

3. A luminance correcting apparatus according to claim 1, wherein the information stored in said second memory means comprises information representing the luminances of the reflected lights in the respective colors which are detected by said detecting means when image lights in at least the two colors are individually projected onto a white screen.

4. A projector having a projecting apparatus for projecting image lights in at least two colors produced by an image forming device onto a screen and a luminance correcting apparatus for correcting the luminance of an image projected onto the screen by the projecting apparatus based on the luminances of reflected lights from image lights projected onto the screen by the projecting apparatus, wherein said luminance correcting apparatus comprising:
    detecting means for detecting luminances of reflected lights of projected lights individually in red, green, blue and one other color having a center wavelength that is different from a center wavelength of red, green and blue;
    first memory means for storing information representing luminances of the reflected lights in the respective colors which are detected by said detecting means;
    second memory means for storing information representing predetermined reference luminances of the reflected lights in the respective colors;
    luminance correcting data generating means for generating luminance correcting data by comparing the information stored in said first memory means with the information stored in said second memory means; and
    correcting means for correcting an image signal input to said projecting apparatus based on said luminance correcting data to increase color reproducibility.

5. A projector according to claim 4, wherein the information stored in said first memory means comprises information produced by subtracting the luminance of ambient light reflected from said screen with no image light projected onto said screen, from the luminances of the reflected lights in the respective colors which are detected by said detecting means.

6. A projector according to claim 4, wherein the information stored in said second memory means comprises information representing the luminances of the reflected lights in the respective colors which are detected by said detecting means when image lights in at least two colors are individually projected onto a white screen.

7. A method of correcting the luminance of an image projected onto a screen in a projector for displaying an image on the screen by projecting image lights in at least two colors produced by an image forming device, comprising the steps of
    successively projecting the image lights in the at least two colors onto said screen, at least one of the at least two colors being a non-additive-primary color, the at least one non-additive primary color is defined by a color band that overlaps a color band of another of the at least two colors;
    detecting a luminance of a reflected light individually in red, green, blue and one other color having a center wavelength that is different from a center wavelength of red, green and blue from an image light projected onto said screen each time an image light in a different color is projected onto said screen;
    generating luminance correcting data by comparing detected luminances of reflected lights in respective colors with predetermined reference luminances for the respective colors; and
    correcting an image signal input to said image forming device based on the generated luminance correcting data to increase color reproducibility.

8. A method of correcting the luminance of an image projected onto a screen in a projector that is used for displaying an image on the screen by projecting a mixed-color image light including image lights in at least two colors produced by an image forming device, comprising the steps of:
    projecting the mixed-color image light onto said screen;
    individually detecting luminance of reflected lights in red, green, blue and one other color having a center wavelength that is different from a center wavelength of red, green and blue included in reflected lights from said screen;
    generating luminance correcting data by comparing the detected luminances in the respective colors with predetermined reference luminances for the respective colors; and
    correcting an image signal input to said image forming device based on the generated luminance correcting data to increase color reproducibility.

9. A method according to claim 7, further comprising the steps of:
    detecting a luminance of reflected light from ambient light which is reflected from said screen with no image light projected onto the screen; and
    subtracting the luminance of the reflected light, that is from said ambient light, from the luminances of the reflected lights of the image lights projected onto said screen, producing differential luminances;
    wherein said luminance correcting data are generated by comparing the differential luminances with said reference luminances.

10. A method according to claim 8, further comprising the steps of:
    detecting a luminance of reflected light from ambient light which is reflected from said screen with no image light projected onto the screen; and
    subtracting the luminance of the reflected light, that is from said ambient light, from the luminances of the reflected lights of the image lights projected onto said screen, producing differential luminances;
    wherein said luminance correcting data are generated by comparing the differential luminances with said reference luminances.

* * * * *